United States Patent [19]
Berg et al.

[11] Patent Number: 5,831,719
[45] Date of Patent: Nov. 3, 1998

[54] LASER SCANNING SYSTEM

[75] Inventors: Johnny L. Berg, Escondido; Francis H. Gerhard, San Juan Capistrano, both of Calif.

[73] Assignee: Holometrics, Inc., Escondido, Calif.

[21] Appl. No.: 631,165

[22] Filed: Apr. 12, 1996

[51] Int. Cl.$^6$ .............................. G01C 3/08; G01B 11/24
[52] U.S. Cl. .................. 356/5.13; 356/5.15; 356/141.1; 356/376
[58] Field of Search ........................ 356/4.01, 5.01–5.15, 356/141.1, 141.4, 376

[56] References Cited

U.S. PATENT DOCUMENTS

| | | | |
|---|---|---|---|
| 3,604,805 | 9/1971 | Scott | 356/28 |
| 3,636,250 | 1/1972 | Haeff | 178/6.5 |
| 3,649,123 | 3/1972 | Ulicki | 356/5 |
| 3,740,141 | 6/1973 | DeWitt, Jr. . | |
| 3,778,159 | 12/1973 | Hines et al. | 356/5 |
| 3,840,293 | 10/1974 | Fine et al. | 350/285 |
| 3,991,417 | 11/1976 | Levine | 343/7.7 |
| 4,005,936 | 2/1977 | Redman et al. | 356/5 |
| 4,025,193 | 5/1977 | Pono et al. . | |
| 4,042,822 | 8/1977 | Brandewie et al. | 250/216 |
| 4,171,907 | 10/1979 | Hill et al. . | |
| 4,179,216 | 12/1979 | Theurer et al. | 356/4 |
| 4,297,030 | 10/1981 | Chaborski . | |
| 4,299,484 | 11/1981 | Holzapfel | 356/28.5 |
| 4,346,989 | 8/1982 | Gort et al. . | |
| 4,413,904 | 11/1983 | Hamada et al. | 356/5 |
| 4,537,502 | 8/1985 | Miller et al. . | |
| 4,689,489 | 8/1987 | Cole | 250/560 |
| 4,721,385 | 1/1988 | Jelalian et al. | 356/5 |
| 4,723,448 | 2/1988 | Veligdan | 73/657 |
| 4,752,662 | 6/1988 | Takagi | 219/10.55 |
| 4,768,876 | 9/1988 | Okino . | |
| 4,829,172 | 5/1989 | Miller | 250/205 |
| 4,855,830 | 8/1989 | Davis et al. | 358/168 |
| 4,935,616 | 6/1990 | Scott | 250/213 |
| 4,950,075 | 8/1990 | Ichinose et al. | 356/141 |
| 4,957,362 | 9/1990 | Peterson | 356/5 |
| 4,979,815 | 12/1990 | Tsikos | 356/1 |
| 4,995,102 | 2/1991 | Ichinose et al. | 342/148 |
| 5,000,567 | 3/1991 | Fleshner | 356/28.5 |
| 5,006,721 | 4/1991 | Cameron et al. | 250/561 |
| 5,029,999 | 7/1991 | Kremer et al. | 356/5 |
| 5,069,545 | 12/1991 | Hinz | 356/28.5 |
| 5,075,878 | 12/1991 | Ohtomo et al. | 364/569 |
| 5,164,733 | 11/1992 | Nettleton et al. | 342/54 |
| 5,200,606 | 4/1993 | Krasutsky et al. | 250/216 |
| 5,216,236 | 6/1993 | Blais | 250/203.2 |
| 5,267,010 | 11/1993 | Kremer et al. | 356/5 |
| 5,285,461 | 2/1994 | Krasutsky et al. | 372/29 |
| 5,353,073 | 10/1994 | Kobayashi | 351/221 |
| 5,485,263 | 1/1996 | Bjourner | 356/4.01 |

*Primary Examiner*—Stephen C. Buczinski
*Attorney, Agent, or Firm*—Baker & Maxham

[57] ABSTRACT

A laser scanner for measuring the spatial properties of objects in a scene within a range less than a predetermined maximum object distance. A laser diode supplies a laser beam that is intensity-modulated by a reference waveform from a waveform generator. An optical scanning system scans the scene with the intensity-modulated laser beam, and receives reflected intensity-modulated light and supplies it to an optical processing system that includes an aperture that transmits a first percentage of light reflected from the maximum object distance and a second, lesser percentage of light reflected from objects closer than the maximum object distance. A photodetector receives the processed light and converts the energy into an amplitude-modulated range signal. A mixer down-converts the frequency into an IF frequency, and a first circuit converts the range signal to the form of a square wave. A phase comparator receives the processed range signal and the reference waveform and outputs a highly accurate signal indicative of the phase difference therebetween. In some embodiments a calibration target may be situated within the scene having a plurality of steps with predefined distances to use as a calibration for measurements of the spatial relationships within the scene.

16 Claims, 11 Drawing Sheets

LASER SCANNING SYSTEM

BACKGROUND OF THE INVENTION

1. Field of the Invention

The present invention relates to scanning laser radar systems for mapping the three-dimensional features of objects in a scene.

2. Description of the Related Art

Effective automation techniques for industry and business often require remote sensing to ascertain information about the particular process being monitored. A variety of sensors have come into existence for such remote sensing purposes, including sensors for measuring temperature, pressure, color, hardness, volume and distance. These devices have solved their respective sensing requirement to varying degrees of success.

Many sensing uses require quantification of the spatial relationship between objects in a scene, which generally involves describing the size, shape and geometry of objects in the scene as well as the spatial relationships between individual objects in the scene. Such spatial data is useful for manufacturing processes, metrology processes, materials handling, automated warehousing, quality control, security, robotic vision, and human vision substitutes, for example. One particularly promising sensor is a scanning laser radar, which uses visible or infrared lasers to obtain information about the scene of interest. Due to the small wavelengths of such lasers, the potential exists to perform very accurate measurements. Furthermore, the continuing development of laser diodes provides a cost effective source of laser radiation and the ability for high modulation rates. Broadly speaking, the laser scanner generates an intensity-modulated laser probe beam that is reflected off the object whose range is to be determined. A reference signal is generated in a waveform generator and this signal then drives a laser diode to produce an intensity-modulated waveform.

The amplitude-modulated laser beam is directed to a scanning system that includes at least a horizontal scanning mirror driven by a constant-speed motor. Many scanning systems also use a vertical scanning mirror orthogonally positioned with respect to the horizontal scanning mirror. The combination of the horizontal scanning mirror and the vertical scanning mirror allow the laser beam to scan an entire area with the intensity-modulated laser beam. Upon reflection from the object, the intensity modulation continues in the reflected beam and as a result, the reflected beam has the same type of intensity modulation as the probe beam, but with a different phase due to the additional distance it travels. When the reflected beam returns, the light energy is converted to electrical energy by a photodetector, and the phase of the intensity-modulated reflected beam is compared with the phase of the reference signal and a distance measurement can be obtained.

Generally, as the amplitude modulation becomes higher in frequency, accuracy increases. However, high frequency electrical signals, for example a 100 MHz signal, can be substantially distorted during subsequent electrical processing and particularly the zero crossings can be shifted, which can substantially degrade accuracy of the subsequent phase measurement. In previous systems, mixers have been used to down-convert the original frequency of the amplitude-modulation to a lower frequency before processing, thereby allowing more accurate, lower frequency processing. However, there is still room for improvement in signal processing.

Other range sensing technologies include television sensors, imaging sensors utilizing CCD arrays, acoustic ranging sensors, and radar.

Television sensors are available which operate in the visible or near infra-red parts of the electromagnetic spectrum. Although an individual sensor provides two-dimensional (2-D) imagery, techniques have been developed for obtaining 3-D scene descriptions through use of techniques such as binocular vision and structured light. These approaches have never been widely accepted because of the computational complexity and time involved in extracting the desired scene data. In addition, controlling factors such as scene lighting balance, lighting intensity, etc. have proven to be very difficult.

Imaging sensors utilizing CCD arrays exist for obtaining images of a scene. Such CCD arrays can operate in the visible, near infra-red or the far infra-red (10–14 micrometer wavelengths). CCD techniques are analogous to the TV sensor approach described above with the exception that the far infra-red band provides a solution for operating any time of day by exploiting specific wavelengths of natural emissions from scene objects at temperatures around 300° K. However, extraction of 3-D data has the same limitations as TV.

Acoustic ranging sensors also exist, similar to Kodak camera acoustic ranging sensors. Techniques using such acoustic ranging sensors are unsuitable for imaging uses because of the inherent lack of precision of range measurement and the wide beam angle.

Radar systems operate in a variety of different wavelengths, from many meters to millimeters. Radar technology has been developed to a high degree for military and aviation applications; however, wide beam angles and lack of required ranging accuracy prevent their successful application in industry and manufacturing.

SUMMARY OF THE INVENTION

A laser scanner is disclosed herein for measuring the spatial properties of objects in a scene. The scene includes one or more objects within a range less than a predetermined maximum object distance. The laser scanner includes a waveform generator that generates a predetermined reference waveform and a laser diode that supplies an intensity-modulated laser beam responsive to the reference waveform. An optical scanning system receives the laser beam, and scans the scene with the intensity-modulated laser beam. The optical scanning system also includes optics for receiving reflected intensity-modulated light from the objects in the scene. An optical processing system is provided for processing the reflected intensity-modulated light. The optical processing system includes an aperture that transmits a first percentage of light reflected from the maximum object distance and a second, lesser percentage of light reflected from objects closer than the maximum object distance. A photodetector is positioned to receive the processed intensity-modulated light from the optical processing system, and convert energy in the incident light into an amplitude-modulated range signal. A mixer is provided to down-convert the frequency of the range signal into a lower (IF) frequency. A first electrical circuit receives the down-converted range signal and converts it into a converted waveform that has, preferably, the form of a square wave with falling and rising edges that correspond to the zero crossings in the amplitude-modulated range signal. The reference waveform is also applied to a mixer that down-converts it to the IF frequency. A second electrical circuit receives the down-converted reference waveform and converts it a second converted waveform. A phase comparator receives the first and second converted waveforms and outputs a highly accurate signal indicative of the phase difference therebetween.

Preferably, the reference waveform has a sinusoidal shape and therefore the intensity-modulated laser beam has a sinusoidally-varying intensity. Also, the second electrical circuit preferably includes a circuit for converting the reference waveform into an approximately square waveform so that said second converted waveform comprises the square waveform.

In some embodiments, a calibration target may be situated within the scene. The calibration target has a plurality of steps with predefined distances between them, and is situated at a known distance from the optical components. During scanning, the phase difference at the reflected surfaces is stored. During subsequent processing of scanned object data, the stored information is used as a calibration to provide accurate range measurements.

DETAILED DESCRIPTION OF THE PREFERRED EMBODIMENTS

An apparatus and related method is disclosed herein for scanning a scene area of interest and rapidly and accurately providing a 3-D mapping of the size, dimensions, geometry and spatial relationships of and between objects in the scanned area. Operator intervention in the scene is minimal or even unnecessary. The general system configuration is shown in FIG. 1.

Figure 1:
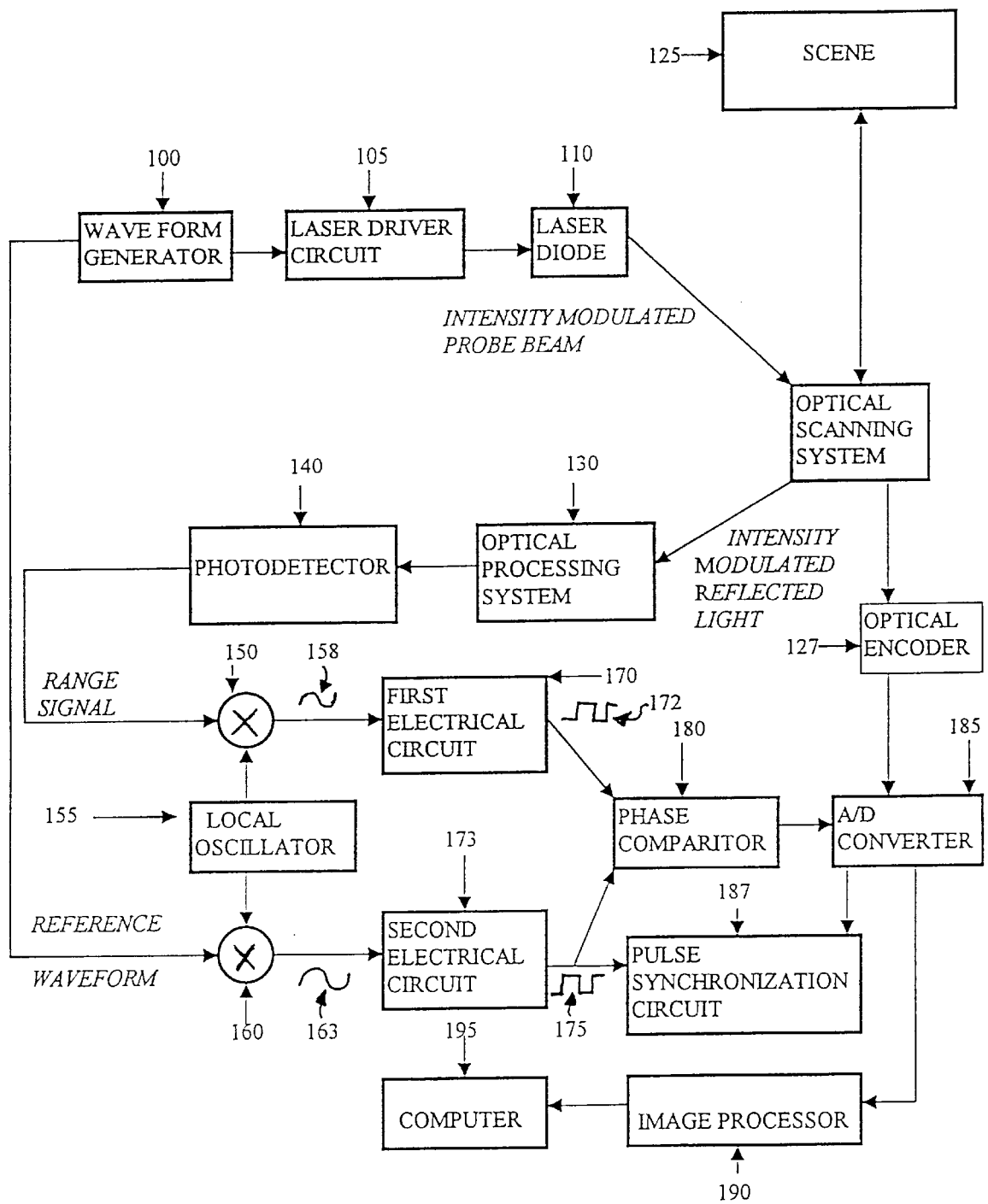
FIG. 1 is an overall block diagram of the laser scanner described herein.

FIG. 1 is a block diagram of a laser scanner system for measuring objects in a scene. For most uses, the scene will have a plurality of objects located within a specified range interval. The expected operational configuration of objects and the background are used to define a predetermined maximum object distance. The laser scanning system includes a waveform generator 100 which generates a predetermined periodic reference waveform based on the maximum measurement distance. Preferably, the reference waveform has a sinusoidal shape, but in other embodiments the reference waveform may have other shapes. The preferred waveform generator 100 is controlled by a precision crystal oscillator, which can be changed to provide different frequencies in order to respond to different sensing distances.

The waveform generator 100 is connected via a laser driver circuit 105 to a laser diode 110. Solid state diode lasers are available operating in the visible or near infra-red (IR), with a range of output powers from 0.1-milliwatts to 12-watts. These lasers can be operated from a DC output to modulation frequencies of tens of GHz. Modulation of the laser beam is required when utilizing phase comparison ranging techniques, and the laser diode 110 is a laser diode whose intensity can be modulated at high frequencies. Such laser diodes are highly cost-effective at the present time. Thus, responsive to the reference waveform, the laser diode supplies an intensity-modulated laser beam.

The laser beam from the laser diode is applied to an optical scanning system 120, described in detail with reference to FIG. 2, that scans the scene illustrated in block at 125 with the intensity modulated laser beam. The optical scanning system 120 also receives a reflected intensity modulated light from the objects in the scene. Particularly, as the scene is scanned, the reflected light from the scanned section is received and applied to an optical processing system 130.

The optical processing system 130 includes optical processing equipment such as described with reference to FIG. 3 that processes the intensity-modulated light. The optical processing system includes an intensity-control aperture that transmits a first percentage of light reflected from the maximum object distance and a second, lesser percentage of light reflected from objects closer than the maximum object distance. As will be described further in more detail with reference to FIGS. 3 and 4, the amount by which the aperture reduces intensity is directly related to the closeness: the closer the object, the greater the percentage of light that is blocked by the aperture.

The light energy from the optical processing system 130 is applied to a photodetector 140, which converts the energy in said light into an amplitude-modulated range signal. The range signal is applied to a mixer 150 that also receives a predetermined local oscillator (LO) frequency from a local oscillator 155. The resulting output signal, as illustrated by a waveform 158, is down-converted in frequency to an IF frequency. That is, the effect of the mixer 150 and local oscillator 155 is to substantially reduce the frequency of the signal down to the IF frequency for subsequent processing. Advantageously, such frequency reduction reduces the distortion during subsequent processing in the first electrical circuit 170, for example.

The reference waveform from waveform generator 100 is, at the same time, applied to a mixer 160 that also receives the LO frequency from the local oscillator 155. The result is a down-converted reference waveform 163 that has the same IF frequency as the down-converted range signal 158. The down-converted range signal 158 is applied to a first electrical circuit 170 that converts the amplitude modulated range signal to a converted waveform 172 having falling and rising edges that correspond to the zero crossing in the amplitude modulated frequency down-converted range signal 158. Similarly, the down-converted reference waveform 163 is applied to a second electrical circuit 173 that converts the down-converted reference waveform into a second converted waveform 175 that has falling and rising edges that correspond to the zero crossing in the down-converted reference waveform. Preferably, the first electrical circuit and second electrical circuit convert the input signals into an approximately square waveform so that the first and second converted waveforms comprise a square wave.

The first and second converted signals are applied to a phase comparator 180 in which the two signals are compared and a DC voltage is output indicative of the phase difference between the two signals. The signal from the phase comparator is applied to an analog to digital (A/D) converter 185. The A/D converter 185 is sampled responsive to an optical encoder 127 that is coupled to the optical scanning system 120 to sense the position of the mirrors and provide a regular sampling interval. As will be described later in more detail, sampling preferably occurs at predetermined spatial intervals that provide consistent output readings regardless of any ripple in the phase comparator output voltage. Particularly, the second converted waveform 175 is applied to a pulse synchronization circuit 187, described in more detail with reference to FIG. 12, that generates a digital pulse synchronized to the ripple and samples the signal at the A/D converter 185 to minimize the effect of ripple.

The output of the A/D converter 185 is applied to an image processor 190, which is in turn controlled by a computer 195. The computer and image processor form the basis for providing application-specific computations.

A waveform generator that has a selectable frequency allows the system design to accommodate the required ranging distance interval by selecting an appropriate laser modulation frequency ($f_m$). The measurement interval $R_m$ (meters) corresponding to this modulation frequency is:

$$R_m = c/2f_m \qquad \text{(Eq. 1)}$$

where c=velocity of light ($3 \times 10^8$ meters/sec)

It should be noted that when the range is less than $R_m$, the phase shift will be less than $2\pi$ radians. When the range is exactly equal to $R_m$, then the phase shift is exactly $2\pi$ radians. A phase shift of $2\pi$ radians looks the same as 0.0 radians or $4\pi$ radians. Thus, an ambiguity interval is defined characteristic of the phase measurement ranging technique. The ambiguity interval starts at 0-radians of phase difference when $R_m$ is 0.0 meters and increases to $2\pi$ radians at the maximum value of $R_m$. At this point the ambiguity interval starts again at 0.0 radians and increases to $2\pi$ radians when the range reaches $2R_m$. This cyclical process continues as the range increases. Thus, in order to remove this ambiguity as to which interval the measurement was made in, a frequency should be selected which has a wavelength comparable to the maximum range contained in the volume of interest.

Figure 2:
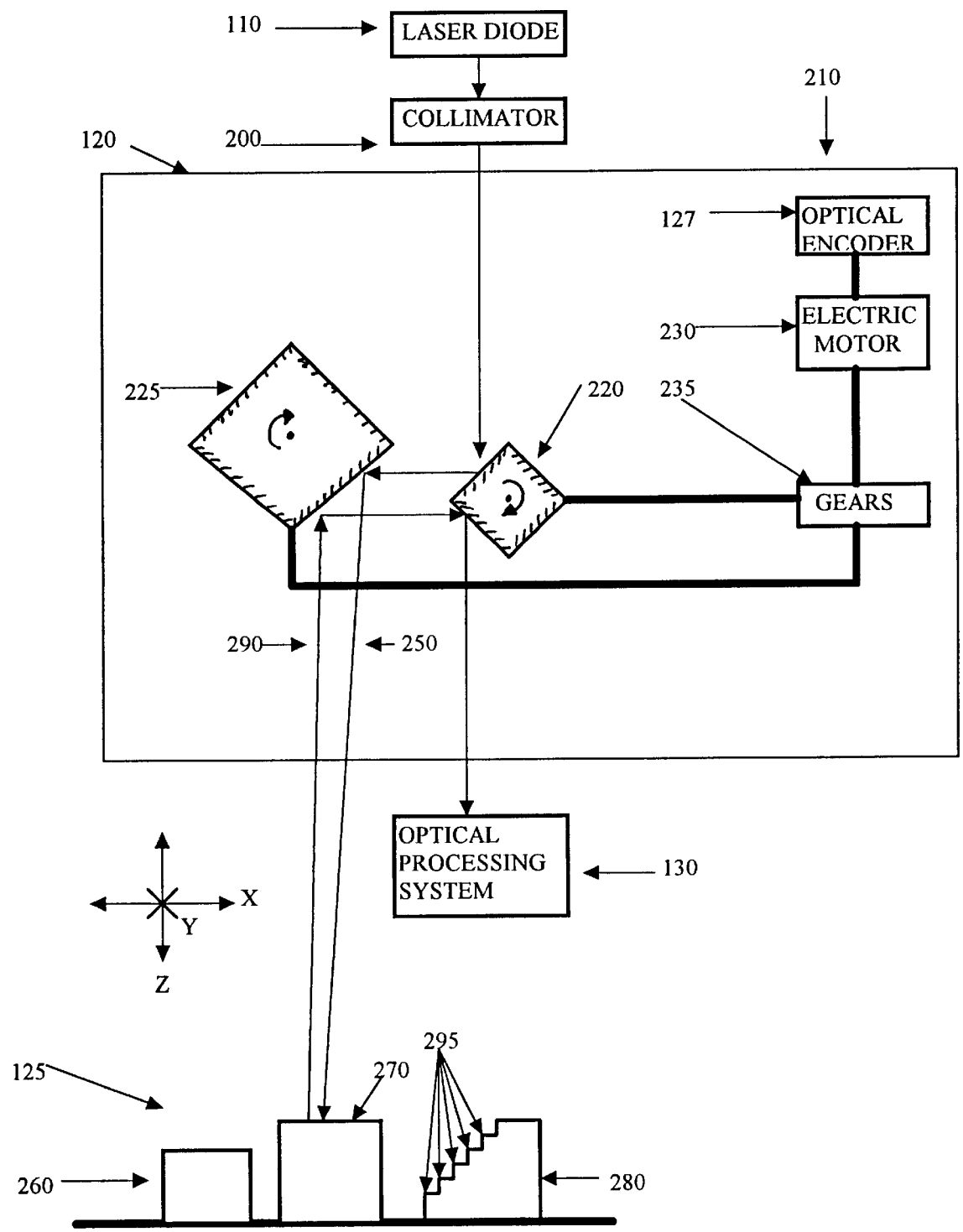
FIG. 2 is a diagram illustrating the optical scanning system and a scene including two objects and a calibration target.

Reference is now made to FIG. 2, which is a diagram illustrating, in more detail, the optical scanning system 120 shown in block in FIG. 1. The intensity-modulated laser beam 110 from the laser diode 110 is applied to a conventional collimator 200 that restricts the rapidly diverging beam emitted from a laser diode thus providing an approximately non-diverging laser beam. The laser beam output from the collimator 200 is applied to an optical system 210 that includes cube mirror 220 and, optionally, a second four-sided mirror 225. The first mirror 220 is provided to scan in the horizontal direction. Motive force is provided by an electric motor 230 through a gear box or other arrangement 235. The gear box 235 mechanically couples the two mirrors thus providing a very rugged and long-lasting scanning configuration. The optical encoder 120 observes the position of the first cube and provides an output indicative of its position. As the cube 220 is rotated at, for example 2400 RPM, each mirror face scans one horizontal line. The rotational rate can be adjusted over a wide dynamic range, with an increase in speed resulting in an increased data rate. The four-sided vertical scanning mirror 225 provides vertical scanning in the instance when the objects in the scene are not moving. For many applications, two mirrors (i.e. a horizontal scanning mirror and a vertical scanning mirror) will be utilized, and because this is a more specific case, it will be described. It should be clear that if only one mirror is necessary, that the second mirror will be simply omitted, and the known velocity and position of the scene will be taken into account by the processing system, particularly the image processing system. The laser beam reflected from the mirrors illustrated at 250 is directed to a scene 125 that, for example, includes a large rectangular square box 260, a narrow box 270 and a calibration target 280, comprising a plurality of steps that will be described in more detail subsequently. The light reflected from the object box 270 in the scene, illustrated at 290, includes the original intensity modulation in the outgoing beam 250. The reflected light 290 is reflected off of the second mirror 225, the first mirror 220, and to the optical processing system 130 which will be subsequently described in more detail, for example with reference to FIGS. 3 and 4.

The calibration target 280 includes a plurality of steps, sometimes referred to as sites 295, each site having a known position in three-dimensional space with respect to the scanning system 210. As each of the sites 295 are scanned, the processor in the subsequent processing system calibrates the phase difference reading to the known, specific distance of each calibration site. Thus, an exact measurement of the space difference corresponding to a known distance can be obtained. The calibration target 280 may comprise many shapes. For example, the calibration sites can be pins, or precisely machined stair-stepped items (as shown). The resulting calibration data is of course acquired at specific times during sensor operation, and any required correction can be applied to each range measurement obtained during that scan cycle. The target 280 may be included in every scene that is scanned, thereby providing an accurate measurement of each scene as it changes. For example, a calibration target may be provided at the edge of a scene, and the different objects may be loaded and unloaded onto the spot next to it, without disturbing the calibration target. In embodiments in which the object is moving, the target 280 may be positioned on a stationary location within the scene to allow continual accurate range measurements.

Once collected, the range data can be used in a number of ways. For example, the system may be instructed to convert range data to shades of gray and then displayed on a computer screen. Accordingly, the closer an object is to the sensor, the darker its color. Conversely, the greater the distance, the lighter its color. In one embodiment, the 3-D images includes about 100,000 individual pixel elements (range measurements) with each pixel given a specific shade of gray in the image. The spatial resolution in the scene is approximately 0.050-inches in x, y (length, height) and 0.2-inches in z (range to the pixel). Analysis of this image allows one to characterize the size, orientation and geometry's of objects located in the scene as well as define the spatial relationships between objects. Another example is using the length, width and height data to compute the volume of the two boxes 260, 270.

The following discussion concerns the accuracy with which the scene can be measured. In this case we must discuss accuracy in measuring x and y as well as the accuracy in making the range measurement. It will be assumed that x represents the horizontal position in an image and y represents the vertical direction in the image. The x dimension is set through use of the optical encoder 127 that accurately measures the angle that the first rotating mirror 220 has turned. The greater the number of counts for a given rotation the smaller the distance between measured points along x, at a specific distance. The accuracy of y is determined by the rotation rate of the second mirror with respect to the first mirror. In order to achieve a pixel in which x and y distances are equal requires that the second mirror rotation rate be 2300 times slower than the first mirror. This speed reduction is accomplished through a mechanical drive train which includes a speed reduction device. The accuracy at which these two dimensions are measured is much less than the pixel distance. In the current configuration, the optical encoder provides 10,000 counts per revolution of the small mirror (and scan motor). The encoder count plus the mechanical linkage/speed reduction to the second mirror yields a square 0.050"×0.050" pixel at a range of about 12-feet from the object. The accuracy that the range measurement can be accomplished is more complicated in definition. The accuracy that range can be measured is embodied in a gaussian statistical process which is governed by the ambiguity interval ($R_m$) and the Signal-to-Noise ratio (S/N) in the detector channel. The accuracy (1-sigma uncertainty) of the range measurement ($R_{accuracy}$) related to SIN and $R_m$ in the following equation:

$$R_{accuracy} = \frac{R_m}{4\sqrt{2} \ (S/N) \sqrt{n}} \quad \text{(Eq. 2)}$$

where
n=number of samples averaged.
The S/N for the Silicon:Avalanche Photodiode used in this system is defined as:

$$S/N = \frac{(P_r R_o M)}{(2q[i_s + (i_b + P_r R_o) M^2 F] B)^{1/2}} \quad \text{(Eq. 3)}$$

where
  $P_r$=Laser signal power on the detector (watts)
  $R_0$=Detector Responsivity (amps/watt)
  M=Gain of Avalanche Photodiode Diode (APD)
  q=Electronic charge
  F=Excess Noise Factor
  B=Electronic bandwidth of system (Hz)
  $i_s$=dark surface current
  $i_b$=dark bulk current Eq. 3 indicates that the dark bulk current is amplified by the APD detector. Since the gain (M) is approximately 100, this noise component can become quite large which is a problem when the laser-related current (the numerator in Eq. 3) is small due to low reflection from the scene object. The dark surface current is not amplified and remains almost constant if the detector temperature remains constant.

Eq. 3 is influenced most heavily by the $P_r$ term. The reason is that $P_r$ can vary as much as a factor of 1000 due to variations in object reflectivity, angle of incidence, range to the target, type of reflection (specular vs. Lambertian), aperture size, variations in laser output power, etc. The way that the received signal influences the phase measurement is described below.

Assume that two sinusoidally-varying signals are input to a phase detector; i.e., an electronic device that provides a DC voltage output proportional to the phase difference between the two sinusoids. Further, assume that the two signals, signal one and signal two, are defined by the two equations given below:

Signal one: $R_1 = A_1 * \sin (\omega t)$  (Eq. 4)

Signal two: $R_2 = A_2 * \sin (\omega t + \phi)$  (Eq. 5)

In other words, both signals have the same frequency but signal two is phase offset by $\phi$. Responsive to these two signals, the phase detector averages the product of these two sine waves over many, many cycles and outputs a voltage proportional to the phase difference (range) from the sensor to the object scanned by the laser radar. Particularly, as can be seen from the following Eqs. 6, 7 and 8, the voltage out of the phase detector is related to the cosine of the phase difference between them. In some phase detectors the voltage out of the phase detector has the following form:

$$V(\text{out}) = \frac{A_1 * A_2}{2} \cos(\phi) \quad \text{(Eq. 6)}$$

In another approach that utilizes a synchronous rectifier technique, the voltage out of the phase detector has the following form:

$$V(\text{out}) = \frac{A_2}{2} \cos \phi. \quad \text{(Eq. 7)}$$

In the technique disclosed herein, a phase measurement approach is used, with the phase detector having the following form:

$$V(\text{out}) = k \cos (\phi) \quad \text{(Eq. 8)}$$

where "k" is a constant that depends upon the circuit configuration and other second order factors. To first order, the phase detector disclosed herein is insensitive to variations in $A_2$; however, there are second order effects related primarily to variations in zero-axis crossings of $A_2$. For the reasons described below, the approach of Eq. 8 has been utilized because it minimizes the effects of $A_2$ variations.

Signal one supplies a reference frequency with a constant amplitude $A_1$. Signal two is the range signal since it is the detector output corresponding to reception of the signal reflected from objects in the scene. The phase is indicative of the time required for the laser beam to accomplish the round trip from the sensor to the scene, and return, and causes a phase difference between the two signals. Since the surface reflectivity from objects in the scene can vary as well as the angle of incidence between the laser beam and the object's surface normal, $A_2$ varies dynamically with the scanning beam, thus resulting in a voltage output that is varying because of amplitude changes. Consequently, one major system design issue that must be addressed in the electronics for the laser radar is that the electronics must give the correct range reading even though $A_2$ may vary in amplitude. Otherwise, one will not get range measurements from the phase comparator that vary only with $\phi$. In general, one addresses this issue in terms of the sensor electronics' "dynamic range", which is the amount of amplitude variation in $A_2$ that can be accommodated without affecting the output voltage of the phase detector. In order to keep the dynamic range within acceptable limits, adequate signal conditioning must occur prior to the signal entering the phase detector.

Therefore, it would be advantageous to provide a system that, at least partially, normalizes the signal provided from the detector such that the zero axis crossings, as influenced by $A_2$, do not influence the value of k in Eq. 8 to first order. As will be described, this advantage is provided by various features including the optical processing system 130, appropriate electrical processing circuits, and other techniques including the calibration described herein. These advantages also provide improved performance for the approaches described in Eqs. 6 and 7. Results of the preferred embodiment have shown ranging accuracy (1-sigma) better than 0.1 inches, which opens up a wide range of applications for laser ranging sensors such as the following: automated materials handling, automated warehousing, determining "dimensional weight" for air cargo companies, bin picking, robotic guidance and navigation, vision substitutes, and automated baggage handling.

The four-sided vertical scanning mirror 225 is an improvement over conventional two-sided scanning mirrors disclosed widely in the prior art. This four-sided mirror 225 provides a much more rugged optical configuration that has an ability to withstand very severe industrial environments without substantially affecting optical alignment or pointing accuracy. Preferably, the mirrors on both the vertical scanning mirrors 225 and horizontal scanning mirrors 220 are diamond-turned aluminum mirrors coated to provide greater than 99% reflectivity at the laser wavelength of interest. When the two mirrors are used (both the vertical and horizontal mirrors) they are interconnected with a mechanical drive train that provides a 2300:1 angular velocity reduction in the vertical scanning mirror 225.

In operation, the 3-D system optical axis is pointed at a predetermined beginning point in the scene and the mirrors of the 3-D system then are controlled to scan the entire scene with an intensity-modulated beam of coherent radiation, e.g. a laser beam. Preferably, the laser beam is modulated with a sinusoidal reference waveform with the result that the beam has a sinusoidally-modulated intensity variation imposed on it. If the scene objects of interest are moving at a known velocity and direction, a single scan mirror can be used to scan the beam perpendicular to the velocity vector of the object at an angle approximately normal to the object surface. However, if the objects are stationary in the scene, two, orthogonally scanning mirrors are used to generate a range image of the scene (each point in the image is a range point). The first mirror provides a horizontal line scan of the surface. The second mirror moves the line in the vertical direction. The net result of these two scan mirror movements generates a TV-like "raster scan" of the scene.

As described above, when the beam strikes objects in the scene, it is then reflected from the object surface. These reflections are specular (mirror-like), Lambertian (diffuse reflection as from a paper surface), or some combination of both. A portion of the reflected laser radiation is detected by the sensor receiver and an electrical signal is produced that varies with intensity, resulting in an amplitude-modulated signal. The amplitude-modulated detector signal is then compared in phase with the original signal used to modulate the laser and the phase difference between the two signals is measured in a phase detector circuit. The measured phase difference provides a direct measure of range to a specific spot in the scene. Continuous measurement of the phase difference as the beam scans across the entire scene field-of-view results in the extraction of a 3-D image which is very analogous to a conventional contour map.

OPTICAL PROCESSING

From the above discussion, it can be seen that the phase comparator output is greatly affected by the amplitude of the signals as well as their phase. This can be a problem because reflections from close objects have a higher amplitude than reflections from objects farther away. Because the received beam intensity 290 and object range are related by a power of two, the difference between the energy reflected from close and far objects can be significant. For example, if the distance to an object is increased by a factor of two, the received reflected beam's intensity will decrease by a factor of four. If the range increases by a factor of four, the received intensity will decrease by a factor of 16. Such large variations cause difficulties in accurate phase measurement, as well as difficulties in designing sensing electronics; for example, it can be difficult to effectively set the gain of an amplifier to prevent saturation of high-level signals while still providing effective gain at low signal levels. Therefore, it would be useful to provide some way to reduce the signal intensity variations, so that the intensity received by the photodetector is at least partially normalized for intensity variations.

Figures 3, 4:
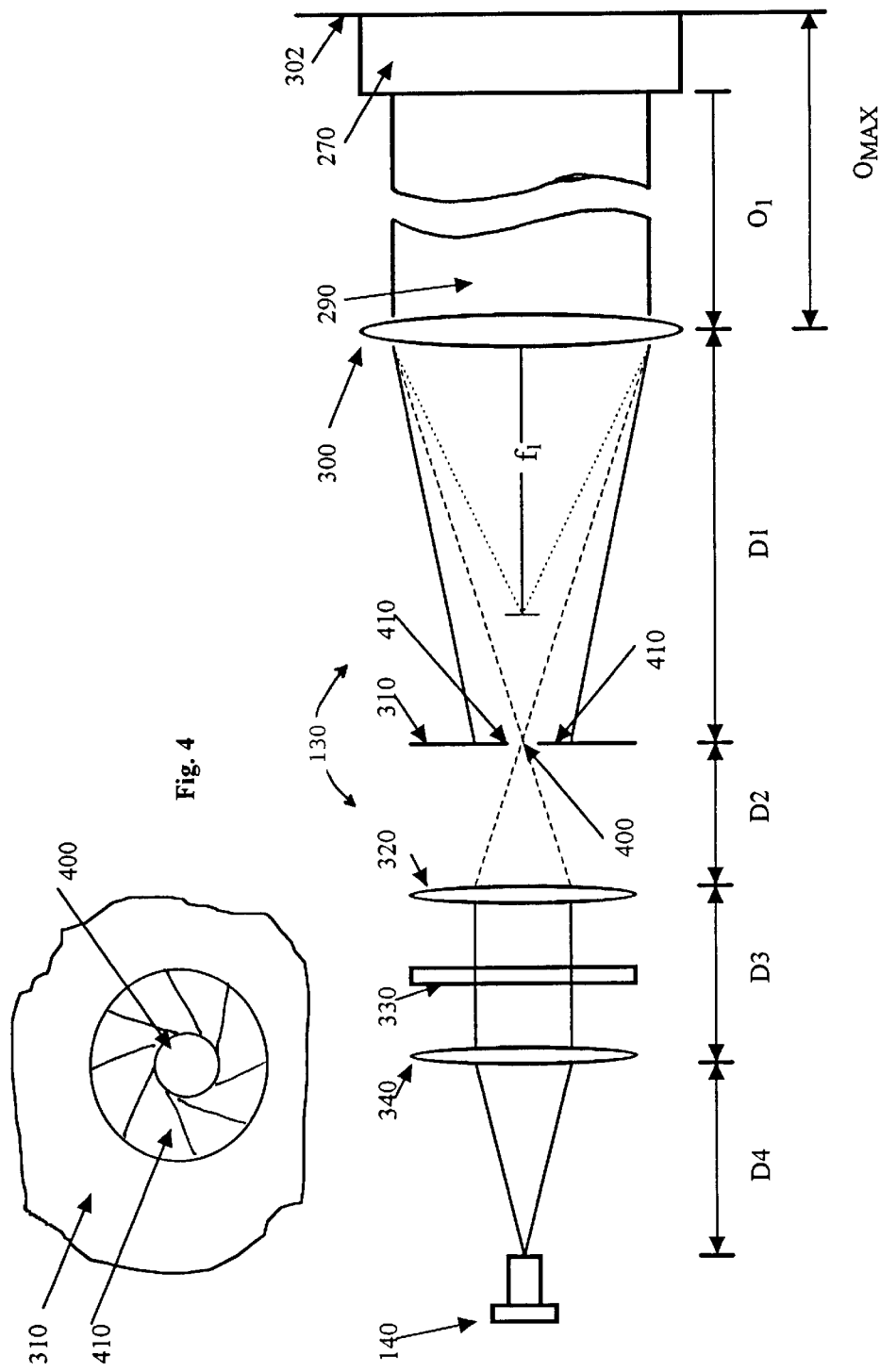
FIG. 3 is a side view of the optical processing system including an intensity-control aperture situated to limit passage of reflections from closer objects.
FIG. 4 is a view of the intensity-control aperture, illustrating the limiting effect of the area around the aperture.

Reference is now made to FIG. 3, which is a side view of the preferred embodiment of the optical processing system 130 that is positioned for reviewing a reflected light beam 290 from the object 270. Preferably, all the focusing elements in the system design include a new optical material having an axially varying refractive index, which is now available under the trade name Gradium™. This material allows lens designs with much shorter focal length and thus allows smaller dimensions in the optical processing system 130. Furthermore, this material can provide for spot sizes an order of magnitude smaller than conventional glass lens. The optical processing system 130 includes a collecting lens 300 positioned to receive the reflected light beam 290 off the surface of the object 270. For purposes of illustration, a distance $o_1$ is used to define the optical path between the surface of the object 270 and the collecting lens 300, and a distance $o_{MAX}$ denotes the optical path distance between the maximum object distance, which in this instance is a wall or floor, for example 302, and the collecting lens 300. The collecting lens 300 has a focal length $f_1$ as shown in FIG. 3.

An intensity-control aperture 310 is spaced apart from the collecting lens at a predetermined distance D1. Preferably, the aperture is circular, and the distance D1 is equal to a distance $i_o$ from the collecting lens, the distance $i_o$ being defined as the image plane distance for an object located at the maximum distance $o_{MAX}$. The value for the optimum distance $i_o$ can be calculated using the lens-maker's formula. In other embodiments, the intensity-control aperture may be positioned at a greater distance from the focusing lens. However, if it were to be placed closer than the distance $i_o$, then unwanted intensity variations could occur.

A collimating lens 320 is positioned with its focal point approximately aligned at the intensity-control aperture 310, so that the beam exiting the collimating lens 300 is collimated. The collimated beam is applied through a narrow band filter 330 having a transmission characteristic designed to pass the laser frequency of the laser beam emitted by the laser diode. Following the narrowband filter 330, a focusing lens 340 is used to focus the collimated, narrowband beam on the photodetector 140.

Advantageously, the intensity-control aperture 310 restricts light energy from closer reflections. By doing so, the phase difference between the two signals can be more accurately measured. An example of this is shown in FIG. 4, in which the central area of the intensity-control aperture 400 is open to allow passage of light, and the surrounding area is opaque and therefore blocks light. Therefore, light originating from the maximum object length can pass through the center open area 400 unimpeded; however, light from closer reflections is increasingly blocked by the area 410 surrounding the center area. As a result, the energy of closer reflections is increasingly blocked by the area 410 surrounding the intensity-control aperture.

Thus, the aperture in the optical processing system is another feature that operates to provide an approximately constant range value, in spite of a varying intensity of the reflected beam, which may be due to variations in range between the reflecting surface and the collecting lens. Furthermore, advantageously, the position of the centroid of the area disk on the surface of the photodetector 140 is maintained at approximately the same position. The following explains, in more detail, how the system works to provide a relatively constant intensity on the detector surface. If the reflecting surface moves toward the collecting lens (i.e., moves closer) then the light intensity impinging upon the collecting lens will increase because of the decrease in the ratio $1/o_1^2$. However, due to the decrease in the object distance, the image plane will change and reside at a more distant location (a larger D1) and therefore the beam diameter at the intensity-control aperture will be larger. As a result, a portion of the beam will be removed by the intensity-control aperture. Since the object distance has changed, the collimating lens will not be in the correct distance from the intensity-control aperture, thus yielding a beam that will be slightly diverging. The result is that the focus of the focusing lens will not be exactly on the detector surface which will further result in reducing the intensity of the beam hitting the detector surface. Finally, even though the intensity of the beam upon the detector has been reduced, the centroid of the airy disk will be maintained in a constant position. It is useful to maintain the centroid of the focused spot in a constant position on the detector in order to reduce the influence of a trapping phenomenon associated with impurities doped into the surface of the detector to improve quantum efficiency. The influence of the trapping phenomenon can directly (and adversely) affect the zero axis crossing of the range signal

ELECTRICAL CIRCUIT FOR PROCESSING THE RANGE SIGNAL

As discussed above with reference to FIG. 1, the laser scanner system measures the distance to an object (the "range") by reflecting a beam off the object and determining the difference between the phase angle of the reflected light beam with respect to a reference signal. The photodetector 140 is utilized to convert the reflected light signal into the electrical range signal, which is supplied to the mixer 150 that provides a down-converted range signal 158 to the first electrical circuit 170.

One problem relating to accuracy is caused by intensity variations in the reflected beam. Particularly, intensity variations in the laser beam incident upon the photodetector 140 cause corresponding amplitude changes in the electrical range signal, which affects the amount of distortion in subsequent electrical processing circuits. As a further problem, the output of the phase comparator 180 also responds to variations in the amplitude of the two input signals supplied thereto. Each of these problems cause accuracy errors as a function of signal intensity.

Figure 5:
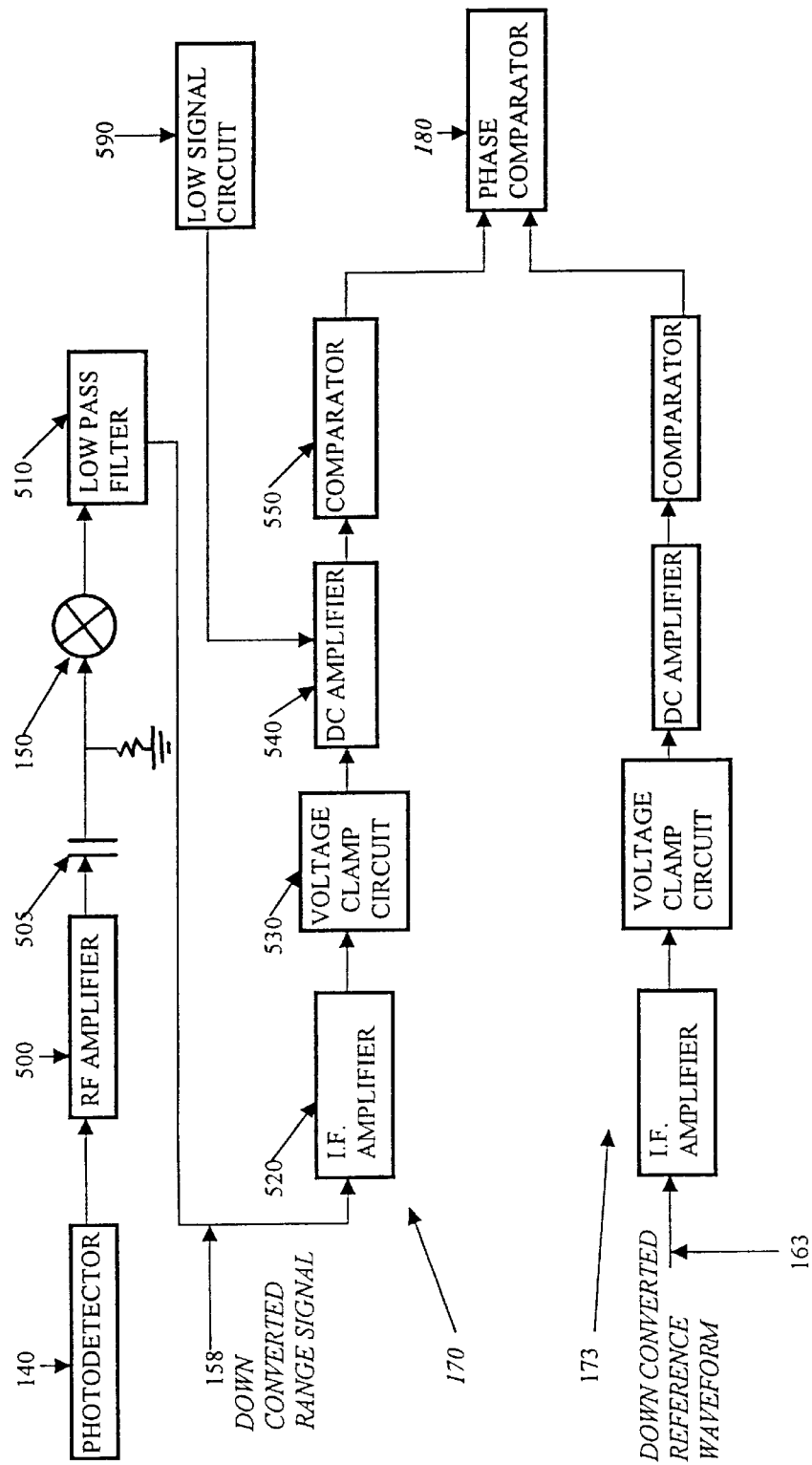
FIG. 5 is a block/circuit diagram of electrical processing circuits for the range signal and the reference waveform.

Reference is first made to FIG. 5. The electrical range signal from the photodetector 140 is first applied to a radio frequency (RF) amplifier 500 that, preferably has a minimum gain sufficient to boost the signal level for effective mixing. The output signal from the RF amplifier 500 is applied to a high pass RC filter 505 and then to the mixer 150, which, as described in more detail with reference to FIG. 1, down-converts the signal to a lower frequency. As a result, distortion during subsequent processing is reduced. The signal from the mixer is applied through a second low pass filter 510 to the first electrical circuit 170 that is described further below. The low pass filter 510 is useful to remove high frequencies generated in the mixing process. The mixer 150 operates to reduce the relatively high laser modulation frequencies (for example, in the 10 MHz to 1,000 MHz range) into a lower frequency, for example between 2 and 4 MHz. The mixer 150 translates these frequencies down to a lower, intermediate frequency (IF), which reduces the distortion upon processing by subsequent stages, and secondly requires only a small gain in the RF amplifier 500. It is known that distortion in amplifiers can be reduced by utilizing negative feedback. However, this technique is less effective at high frequencies due partly because the loop gain of the amplifier is reduced. Thus, the amount of distortion in these amplifiers can be proportional to signal level. The mixer minimizes the number of amplifier stages that must handle the higher frequency utilized to modulate the laser beam. The benefit of having a low gain is obtained in the RF amplifier 500 and as a result of this very small gain, the output signal level and the resulting distortion will also be small. During subsequent processing, the signal levels will be higher, but due to the lower IF frequency, distortion will be smaller.

In the preferred embodiment, the first electrical circuit includes an IF amplifier 520, a voltage clamp circuit 530 followed by a DC amplifier 540 which is then followed by a comparator 550. The processed output from the comparator 550 is supplied to the phase comparator 180. All stages up to the voltage clamp circuit 530 are RC-coupled to block variations in DC levels. In other embodiments, more than one clamp circuit can be employed to provide a greater range of signal variation.

The IF amplifier 520 provides the level of gain necessary for subsequent processing. The voltage clamp circuit 530 limits the maximum voltage of the signal, and thereby at least partially normalizes the signal for intensity variations. The DC amplifier 540 adds further gain before the signal is applied to the comparator 550. Because all the phase information is included in the zero axis crossing (and not in the amplitude) the limiting of the amplitude by the Shottky diodes within the voltage clamp circuit 530 does not introduce error. The gain in the AC amplifiers is restricted so that they are not overdriven when the intensity of the reflected laser beam is at a maximum because, when overdriven, the AC amplifiers may require a lengthy time to recover. On the other hand, when the intensity is minimum, it may be desirable to have more gain in order to present the largest possible signal to the comparator 550. Particularly, the comparator 550 converts the zero axis crossings of the electrical signal to a square wave that has a consistent amplitude.

Figure 6:
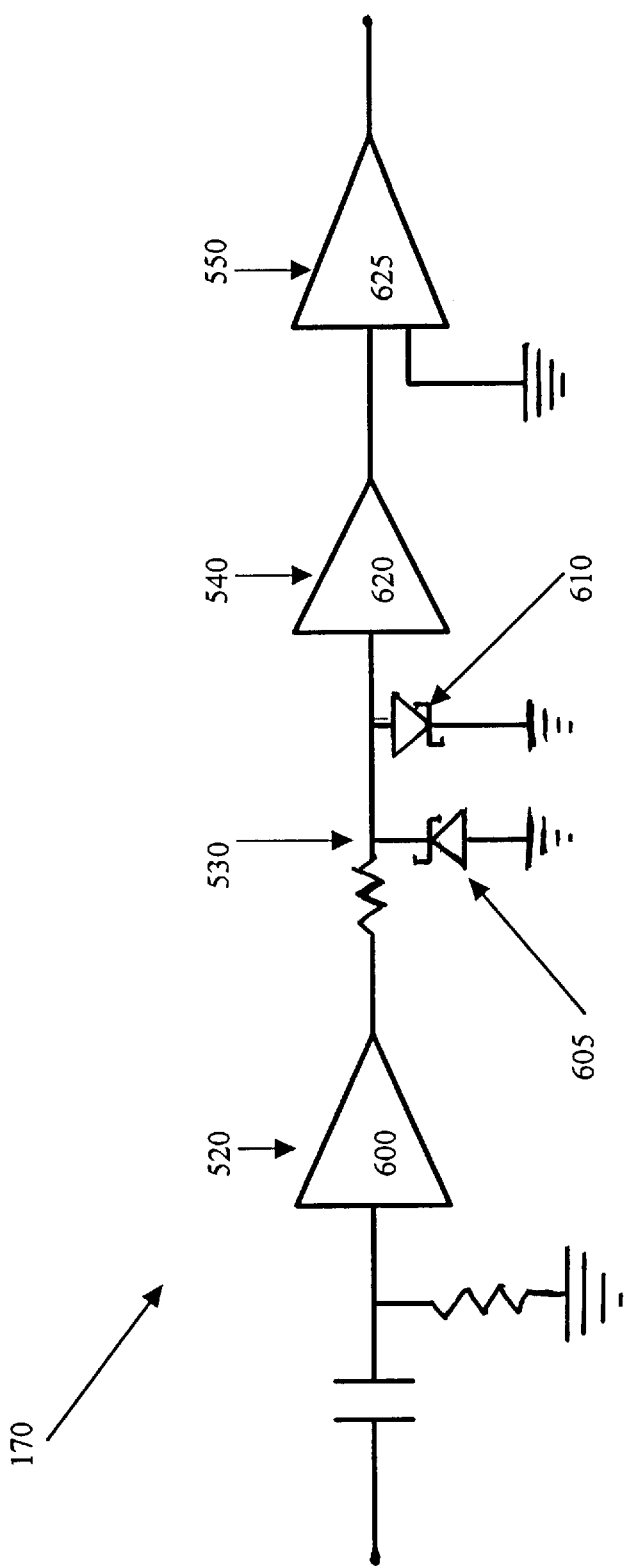
FIG. 6 is a circuit diagram of one embodiment of the first electrical processing circuit.

FIG. 6 is a circuit diagram of one embodiment of the first electrical circuit 170. The IF amplifier 520 is represented by the amplifier 600, and the voltage clamp circuit 530 includes a first Shottky diode 605 and an oppositely configured second Shottky diode 610 coupled in parallel between ground. The DC amplifier 540 is represented by an amplifier 620 and the comparator 540 is represented by an amplifier 625. The output of the comparator 550 is a square wave, whose amplitude is independent of the input signal, whereas the transitions of the output square wave are accurately representative of the input signal zero axis crossings. Furthermore, the slope of the transitions at the input of the comparator are increased and the slope does not vary with the input signal amplitude, which reduces errors caused by slope variations at the zero axis crossing of the input signal. As a result, the circuit virtually eliminates variations in the amplitude and variations in the rise and fall times of the input signal to the phase comparator 180, thereby reducing or eliminating errors due to variations in the reflected light beam's intensity.

LOW SIGNAL CIRCUIT 590

In some situations, the amplitude of the reflected light beam is very small, such as when the reflective surface is mirror-like, and is at a non-normal angle to the incident laser beam. In this instance, the reflected beam has a very low amplitude and in that instance, without correction, the system may not be able to accurately determine the zero crossing and could put out a totally erroneous range reading. For example, if the bottom of the measurement volume is a floor having a pattern of highly reflective spots, the collimated beam is deflected when it hits one of these spots, and virtually none of the laser energy is reflected back to the detector. As a result, a totally erroneous range reading can cause a significant error.

Referring again to FIG. 5, a low signal circuit 590 is coupled between the DC amplifier 540 and the comparator 550. The low signal circuit 590 senses the signal at the output of the DC amplifier 540, and if below a predetermined level, the low signal circuit 590 supplies a signal to the comparator 550 to that has the effect of changing the range output voltage of the phase comparator 180 to correspond to a predetermined range. Preferably, this predetermined range is that of the floor. In this instance, the range of the floor must be known and supplied in advance to the system. In other embodiments, a low signal can be sensed, and responsive thereto an indication can be sent to the computer and a correction can be done in software. In still other embodiments, the low signal may be detected at other nodes in the circuit, for example at the input of the DC amplifier 540. Furthermore, the alternate range value could be adjustable so that for different geographic locations or different object measurements, different values would be utilized. Thus, any means of detecting a low range signal amplitude and a means of altering the range output voltage to a predetermined value is provided, or alternately, a means for detecting a low range signal can be applied, and this fact can be communicated to correct the erroneous reading in software.

CURRENT SOURCE

Figure 7:
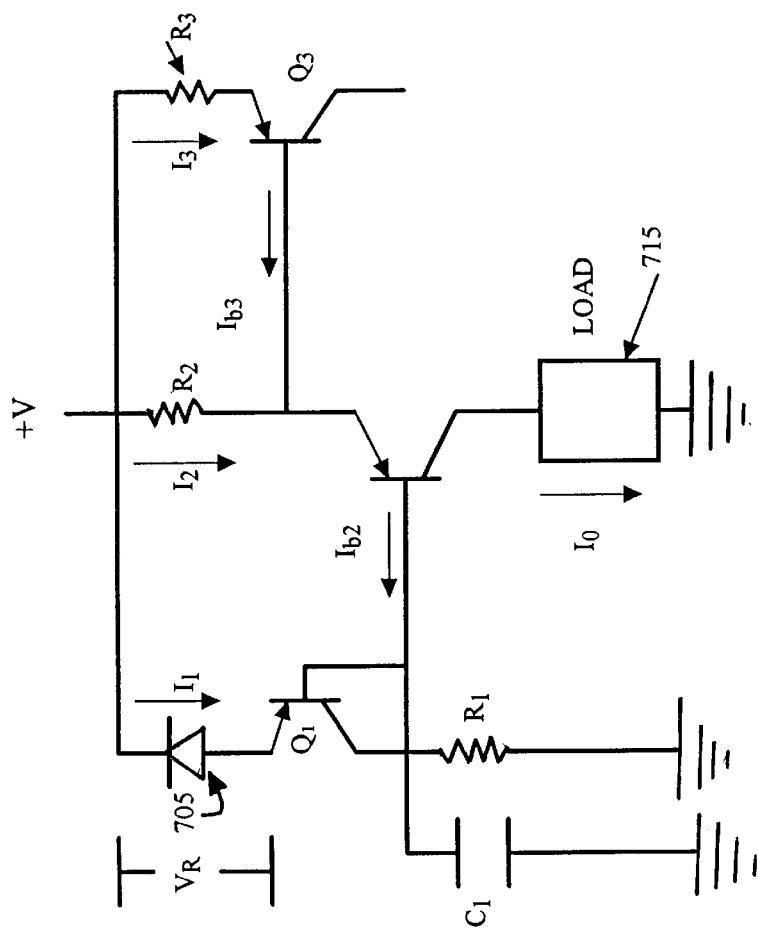
FIG. 7 is a circuit diagram of the preferred current source.
Figure 10:
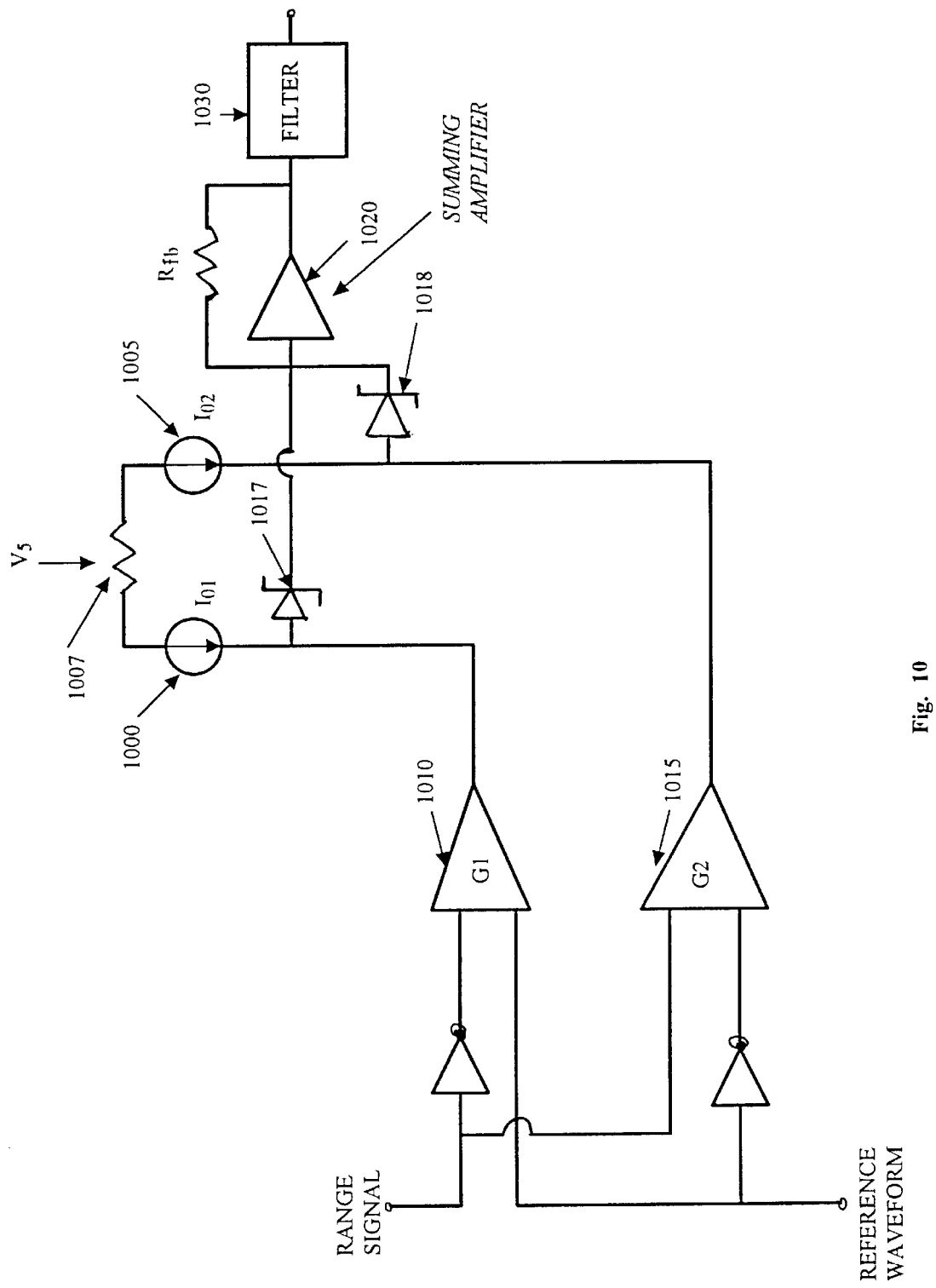
FIG. 10 is a circuit diagram of the preferred phase comparator.

FIG. 7 is a circuit diagram of the preferred current source used in the phase comparator 180, which is shown in FIG. 10 and described with reference thereto. The preferred current source of FIG. 7 provides a highly accurate and stable current source to the time varying load presented by the phase comparator. The high frequency characteristics are excellent even when the current is supplying a switched load. The AC equivalent circuit (shown in FIG. 8) closely approximates a perfect current source shunted by the collector capacitance of a single high frequency transistor.

Referring to FIG. 7, transistors $Q_1$, $Q_2$, and $Q_3$ are matched bipolar junction transistors (BJTs) implemented in an integrated circuit, which means that the characteristics of all three transistors including their gain ($\beta$) are almost identical. Because they are within an integrated circuit, all three devices are maintained at the same temperature. A zener diode 705 is reverse-coupled between the voltage source +V and the emitter of transistor $Q_1$. The zener diode functions as a precision voltage reference $V_R$ between V+ and the emitter of $Q_1$. The base of $Q_1$ is coupled to its collector, and therefore functions as a diode. A resistor $R_1$ is coupled between ground and the collector of transistor $Q_1$.

The second transistor $Q_2$ has a base coupled to the base and collector of $Q_1$. The collector of $Q_2$, which provides the desired current $I_0$, is coupled to supply the fixed current to a load shown at 715 between the collector of $Q_2$ and ground. The load 715 is representative of the circuits that receive the current $I_0$. A second resistor $R_2$ is coupled between the voltage source +V and the emitter of transistor $Q_2$. The resistors $R_1$ and $R_2$ are selected so that the currents through $Q_1$ and $Q_2$ are equal. Under these conditions, the base-emitter voltage drops in $Q_1$ and $Q_2$ will be approximately equal and the voltage across $R_2$ will be equal to $V_R$. Because of the matched characteristics of the transistors, the voltage across $R_2$ remains constant at $V_R$ over a wide temperature range in spite of the 2 mV/°C. temperature coefficient of the base-emitter drops.

Ignoring $Q_3$ for the moment, the output current $I_o$ from the collector of $Q_2$ equals $I_2$ (which is the current through $R_2$) minus $I_{b2}$ (which is the base current in $Q_2$). The base current $I_{b2}$ is approximately equal to $I_2$ divided by the common emitter current gain $\beta$. The temperature coefficient of $\beta$ is approximately 1%/°C. Writing the equation for $I_o$ using the approximation that relates $\beta$ to the emitter current and base current (i.e. $\beta = I_e/I_b$)

$$I_o = I_2 - I_2/\beta + I_2 * (1\% * dT)/\beta \qquad \text{(Eq. 9)}$$

where dT is the change in temperature.
For a typical value of 30 for $\beta$, $$I_o = I_2 * (1.0 - 0.03333 + 0.000333 * dT) \qquad \text{(Eq. 10)}$$

The temperature coefficient of output current is then 333 PPM/°C.

In order to reduce the temperature coefficient, the transistor $Q_3$ is coupled to provide the extra current to compensate for $I_{b2}$. The transistor $Q_3$ has a base coupled to the emitter of $Q_2$, and a collector coupled to ground. A resistor $R_3$ is coupled between the voltage source +V and the emitter of $Q_3$. The value of $R_3$ is selected so that $I_3$ (the current through $R_3$) is equal to $I_2$ and therefore $I_{b3}$, the base current through $Q_3$, is equal to the base current through $Q_2$, tracking it over the entire temperature range. Together with $I_2$, $I_{b3}$ flows into the emitter of $Q_2$. Although a small portion of this current ($I_{b3}$) flows out of the base of $Q_2$, the bulk of $I_{b3}$ flows out of the collector of $Q_2$ to compensate $I_o$ for the flow $I_{b2}$ out of the base of $Q_2$. Stated mathematically:

$$I_o = I_2 - [I_2 * (1 - 1\% * dT)/\beta] - (I_3 * 1\% * dT)/\beta$$

Therefore:

$$I_o = I_2 - I_2/\beta \qquad \text{(Eq. 11)}$$

Consequently, within the limitations of our approximations, the temperature variations cancel.

The capacitor $C_1$ is coupled between ground and the base of $Q_2$ so that the capacitor $C_1$ effectively grounds the base of $Q_2$ at high frequencies. By grounding the base of transistor $Q_2$, a configuration is provided that has a very high output impedance, which is useful for a current source.

Figure 8:
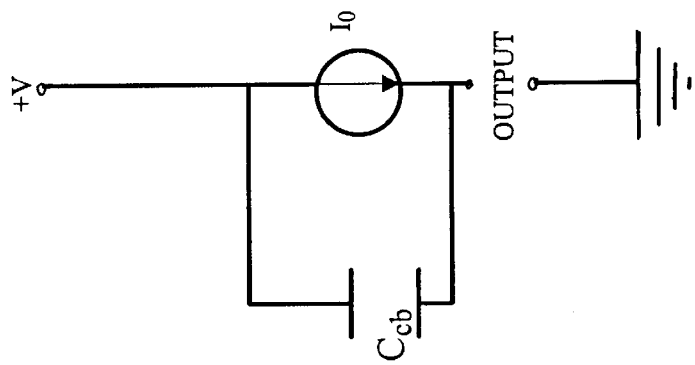
FIG. 8 is a circuit diagram of the high frequency output impedance of a common base transistor stage.

FIG. 8 is a simplified representation of the current source shown in FIG. 7. Particularly, the high frequency output impedance of a common base transistor stage is represented in FIG. 8 as a current source supplying $I_o$ in parallel with a capacitance shown at $C_{cb}$, which is the collector-base capacitance of $Q_2$ plus any stray capacitance in the circuit wiring.

Figure 9:
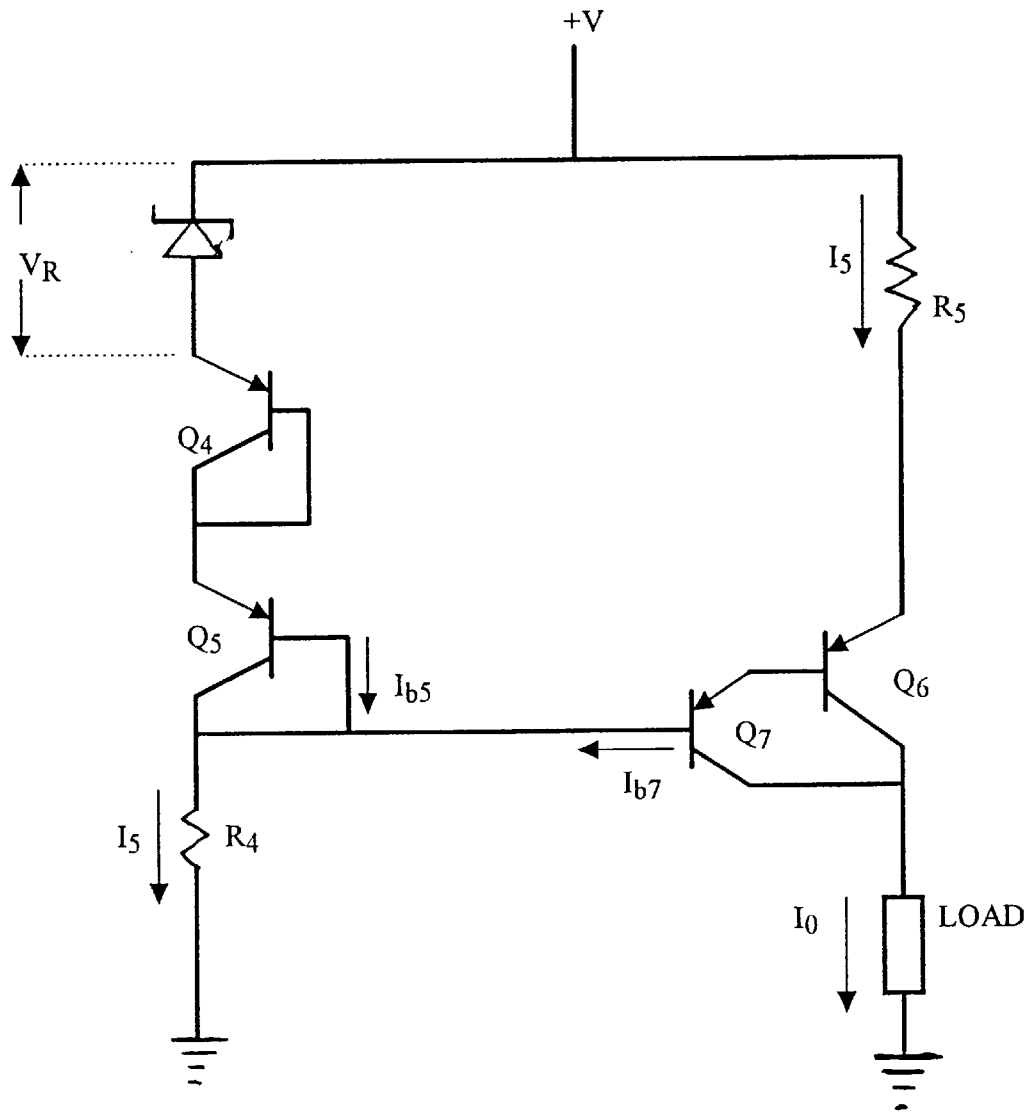
FIG. 9 is a circuit diagram of a Darlington configuration current source.

There are other current sources that can provide different ways of compensating for the temperature coefficient of collector current in the transistors. FIG. 9 is a circuit diagram of a current source that uses a Darlington configuration to compensate for temperature variations. Although functional, this circuit has two drawbacks:

1. The output capacitance is doubled over the preferred embodiment, and

2. The base current $I_{b7}$ from $Q_7$ is lower than the base current $I_{b5}$ from $Q_5$ and therefore temperature compensation of the base emitter drops is degraded.

The embodiment of FIG. 7 is preferred.

THE PHASE DETECTOR

The phase comparator 180 (sometimes referred to as a "phase detector") outputs a DC voltage whose instantaneous value is proportional to the phase angle of the received light signal. By their basic nature, phase detectors also put out a small amount of ripple at the input signal frequency and harmonics of that frequency, which sometimes results in random errors in the range readings.

Ripple can be reduced by increasing the operating frequency of the phase detector, but this will increase other frequency dependent errors in the phase detector. Another approach to reduce ripple is to use very long time constant filters at the output of the phase detector, however, that approach increases the response time of the system to steps and other variations in the range value, which degrades the image. Good dynamic response is highly desirable.

Three techniques are disclosed to reduce ripple without introducing the above kinds of errors.

FULL WAVE SYSTEM

In a full wave system, information is transmitted to the output of the phase detector at each zero axis crossing of the detector. Consequently, the output ripple primarily includes only harmonics of the input frequency and therefore permits a higher frequency filter to be used. The circuit described herein includes a provision for adjusting the two halves of the detector to minimize the fundamental frequency output of the filter.

FIG. 10 is a block diagram of the preferred embodiment of phase comparator 180. Two current sources including a first current source 1000 and a second current source 1005, each preferably comprise circuitry as shown in FIG. 7 above. The voltage $V_s$ from a voltage source is supplied to a variable resistor 1007 that is adjustable to equalize the currents $I_{O1}$ and $I_{O2}$ that flow, respectively through the first current source 1000 and the second current source 1005. By balancing the current, the fundamental component of the ripple can be minimized.

The processed range signal from the first electrical circuit 170 and the processed reference waveform from the second electrical circuit 173 are both supplied to a first gate 1010 and a second gate 1015, which are open collector AND gates. The output of the first gate 1010 is coupled to the output of the first current source 1000 and to a first Schottky diode 1017. The output of the second gate 1015 is coupled to a second Schottky diode 1018 and to the output of the second current source 1005. The outputs of the first and second Schottky diodes are coupled to an input of a summing amplifier 1020. A feedback resistor $R_{fb}$ is coupled between the output and input of the summing amplifier. A filter 1030 is coupled to the output of the summing amplifier in order to remove unwanted frequency components. When the output of the first gate is high, current $I_{O1}$ flows through the first diode to the input of the summing amplifier 1020. When it is low, $I_{O1}$ is shunted to ground by the gate. The same is true for $I_{O2}$.

Figure 11:
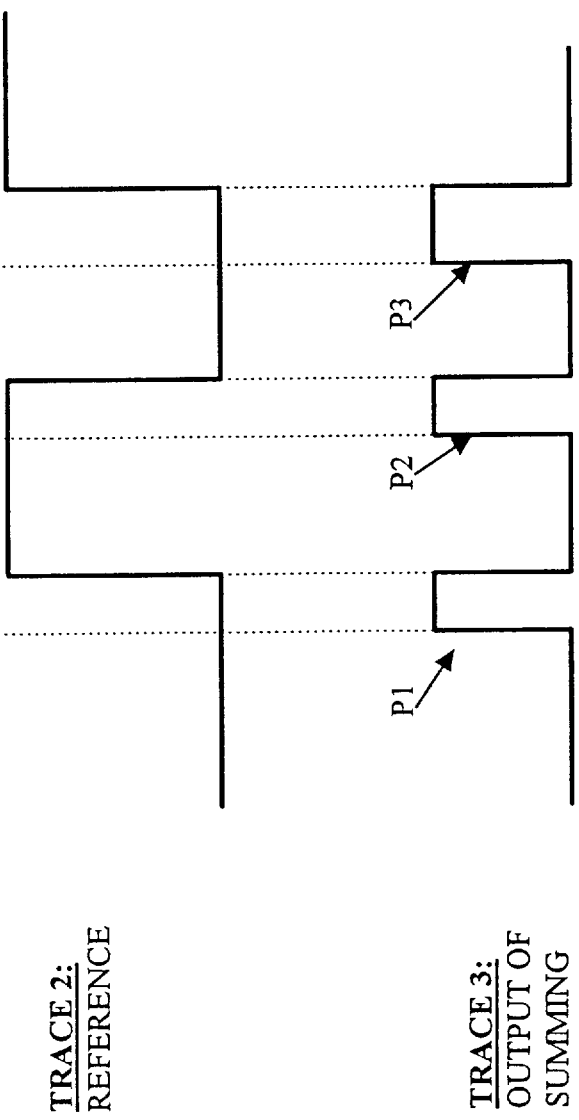
FIG. 11A is a graph of a first reference waveform.
FIG. 11B is a graph of a second reference waveform.
FIG. 11C is a graph of the output of the summing amplifier output responsive to the first and second reference waveforms.

FIGS. 11A, 11B and 11C show exemplary range signal and reference waveforms. Optionally, the range signal is the same as the reference waveform except for a delay by an amount proportional to the distance to the target. The output of the first gate will be true and current $I_{O1}$ will flow into the amplifier summing junction when the reference signal is true and the range signal is false, which results in pulses P1 and P3 in FIG. 11C. By the same reasoning, when the reference signal is false and the range signal is true the output of G2 is true and $I_{O2}$ flows into the summing junction. This results in pulse P2 in FIG. 11C.

By examining the three waveforms (FIGS. 11A, 11B and 11), it can be seen that when the delay of the range signal relative to the reference signal is zero, the output pulse is zero. When the range signal delay is 180°, the output pulse is maximum. The average of the output waveforms is directly proportional to the width of the pulse, which is directly proportional to the delay of the range signal.

If the height and width of all of the pulses are the same, the fundamental component will be zero. The heights of alternate pulses can be adjusted to be equal by means of the variable resistor 1007 (FIG. 10). To a limited extent the variable resistor can also be used to compensate for width variations.

Bessel Output Filter

Preferably, the filter 1030 coupled to the output of the summing amplifier is a linear phase (also known as Bessel filter) step response filter. The effect of this filter is to approximate a delay, which results in less time distortion of the range output, allowing a longer time constant filter to be used for a given permissible amount of step response error, reducing ripple.

Synchronization of Digitization and Ripple

The output of the phase detector is digitized periodically by the A/D converter 185, and the resultant range data is sent to a computer for processing. By deriving the digitize command from the phase detector reference signal, each sample of the output waveform can be taken at a fixed point in the phase detector output ripple waveform. By this technique, the error due to ripple can be made smaller and also made to be fixed rather than random. The latter can be biased out whereas an error random in time cannot.

Figure 12:
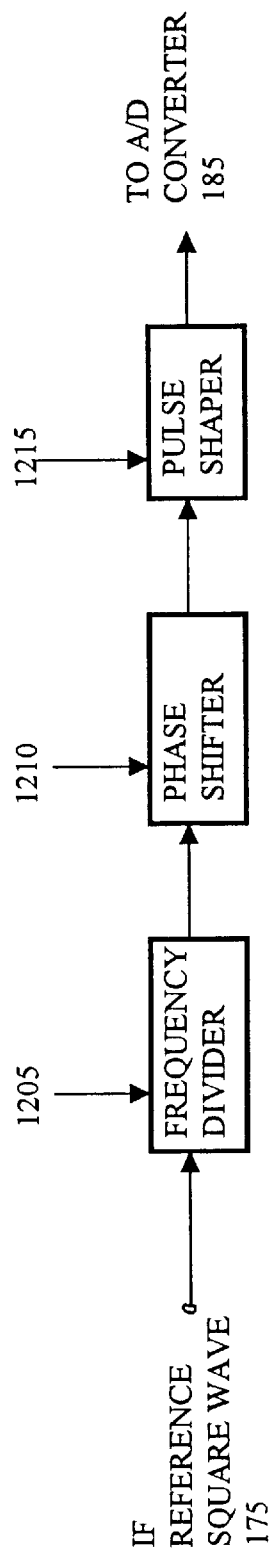
FIG. 12 is a block diagram of a circuit to compensate for ripples in the signal output from the phase comparator.

FIG. 12 is a block diagram of the pulse synchronization circuit 187, which is shown in block form in FIG. 1, that generates a digital pulse synchronized to the ripple. Since the IF reference frequency determines the information update rate, it also determines (by a factor of 2) the rate at which ripple appears on the output signal. Preferably, the digitization rate is lower than the IF reference waveform, for example by a factor of eight. Therefore, the IF reference square wave 175 (FIG. 1) from the second electrical circuit 173 is input to a frequency divider 1205 that provides a predetermined submultiple of the IF reference frequency. The frequency-divided output is applied to a phase shifting network 1210 to cause the sample to be taken at the optimum point in the output ripple waveform. The phase shifting network delays the sampling signal for a predetermined time period based, for example on calculations and experimental results. Accordingly, the sampling signal is shifted to a time when each sample can provide a consistent output, preferably at the zero-axis crossing of the ripple. The shifted output from the phase shifter 1210 is then applied to an (optional) pulse shaping circuit 1215 that shapes the output of the phase shifting network to a logic signal appropriate for use as a sampling signal in the A/D converter 185.

The calibration target 280 (FIG. 2) has a series of reflective steps 295 at predefined distances with respect to the optical unit 210. During a measuring operation, the laser scans the calibration target, and the phase detector output, indicative of the phase difference of the reflected radiation from each of the steps, is noted together with its predefined distance. Thereby, each subsequent measurement from the scene can be calibrated with known values during data processing. Advantageously, use of the calibration target in the scene allows precise measurements and high consistency between measurements.

Figure 13:
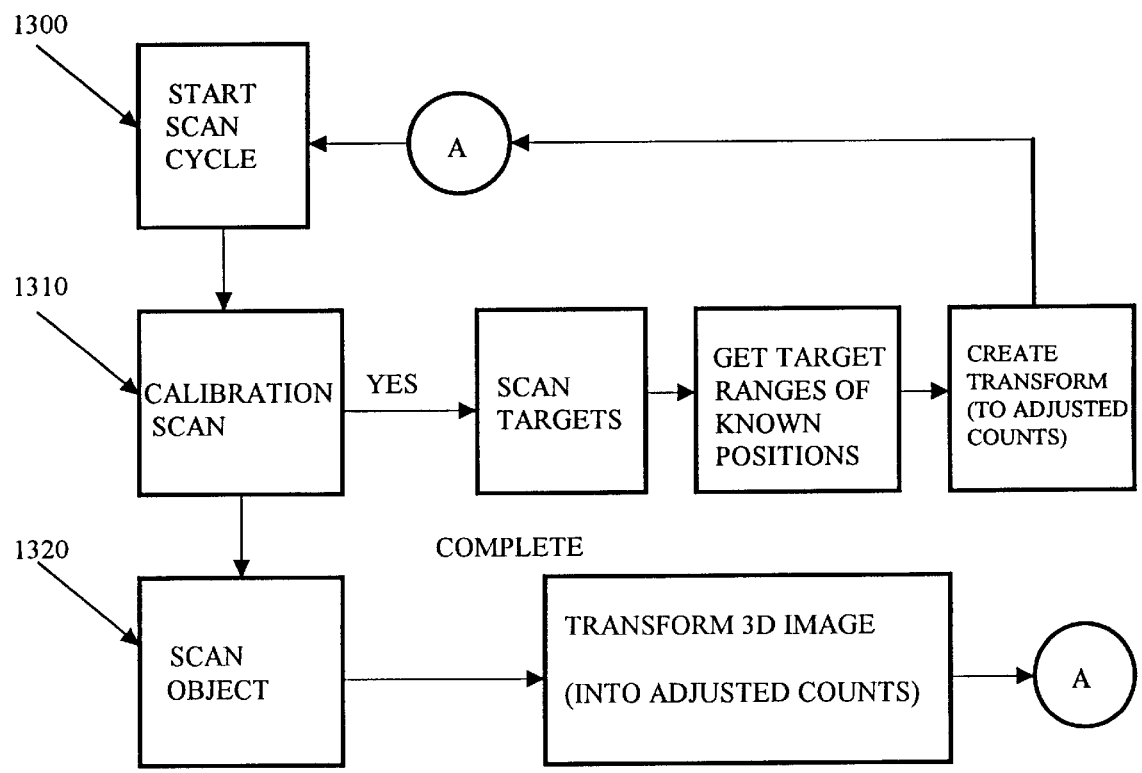
FIG. 13 is a flow chart of steps for using the calibration targets during processing of data.

FIG. 13 is a flow chart of operations for calibration. Calibration is performed in order to convert input range count values into adjusted values through, at least, one or more known target positions. Calibration targets at given range distances (in inches or millimeters) from the scanner are assigned fixed range counts for their positions.

The scan cycle begins at 1300, and beginning at 1310, the targets are scanned and their input range counts are compared against their assigned counts. This comparison yields the offset values necessary to correct the measured to the fixed count values for the actual distance in inches (or millimeters). When calibration is completed, operation moves from box 1310 to box 1320, and the adjusted range count couplets are stored to be used to transform scan objects of unknown positions, from input range counts to adjusted range count values. Depending on the application, these couplets can be averaged to a single offset constants converting values over short ranges; put into tables for linear interpolation over larger ranges; or expanded into a two dimensional array of pixel transform values for fast throughput performance.

We claim:

1. A laser scanner for measuring objects in a scene having a plurality of objects and a calibration target within a range less than a predetermined maximum object distance, comprising:

a waveform generator that generates a predetermined reference waveform;

a laser diode that supplies an intensity-modulated laser beam responsive to the reference waveform;

an optical scanning system for scanning the scene with the intensity-modulated laser beam and receiving reflected intensity-modulated light from the objects in the scene;

optical means for processing said reflected intensity-modulated light, said optical means including an intensity-control aperture that transmits a first percentage of light reflected from the maximum object distance and a second, lesser percentage of light reflected from objects closer than the maximum object distance;

a photodetector positioned to receive said processed intensity-modulated light from the optical means, said photodetector converting energy in said light into an amplitude-modulated range signal;

a first electrical circuit for converting the amplitude-modulated range signal into a converted waveform that has falling and rising edges that correspond to the zero crossings in said amplitude-modulated range signal;

a second electrical circuit for converting the reference waveform into a second converted waveform that has falling and rising edges that correspond to the zero crossings in said reference waveform;

a phase comparator coupled to receive said first and second converted waveforms and output a signal indicative of the phase difference therebetween; and a processor means for calibrating measurements of distances to objects in the scene from distances to the calibration target.

2. The laser scanner of claim 1 wherein said intensity-control aperture comprises a circular shape.

3. The laser scanner of claim 1 wherein said waveform generator comprises means for forming a sinusoidal waveform, so that said reference waveform has a sinusoidal shape and said intensity-modulated laser beam has a sinusoidally-varying intensity.

4. The laser scanner of claim 1 wherein said first electrical circuit includes a circuit for converting the amplitude-modulated range signal into an approximately square waveform so that said first converted waveform comprises said square waveform.

5. The laser scanner of claim 4 wherein said second electrical circuit includes a circuit for converting the reference waveform into an approximately square waveform so that said second converted waveform comprises said square waveform.

6. The laser scanner of claim 1 wherein said optical scanning system includes a horizontal scanning mirror.

7. The laser scanner of claim 6 wherein said optical scanning system includes a vertical scanning mirror operated cooperatively with the horizontal scanning mirror to scan a predetermined area.

8. A method for measuring objects and a calibration target in a scene having a range less than a predetermined maximum object distance, comprising the steps of:

providing a laser scanner that includes
a waveform generator that generates a predetermined reference waveform,
a laser diode that supplies an intensity-modulated laser beam responsive to the reference waveform, and
an optical scanning system for scanning the scene with the intensity-modulated laser beam and receiving reflected intensity-modulated light from the objects in the scene;

situating said calibration target within said scene, said calibration target having a plurality of steps with predefined distances between them;

scanning the scene with said intensity-modulated laser beam to provide intensity-modulated reflected light from the objects in said scene;

processing said intensity-modulated light reflected from the objects in the scene, including transmitting a first percentage of light reflected from the maximum object distance and a second, smaller percentage of light reflected from closer objects;

applying said processed intensity-modulated light to a photodetector to provide an amplitude-modulated electrical range signal;

converting the range signal into a converted waveform that has falling and rising edges that correspond to the zero crossings in said amplitude-modulated range signal;

converting the reference waveform into a second converted waveform that has falling and rising edges that correspond to the zero crossings in said reference waveform;

detecting the phase difference between said first and second converted waveforms and providing a phase difference signal indicative of distances to the objects and the calibration target distances in the scene; and processing the phase difference signal using information from the calibration target to calibrate measurements which arc used to define distances to the objects in the scene.

9. The laser scanner of claim 8 wherein the step of processing the intensity-modulated light is performed with an intensity-control aperture having a circular shape.

10. The laser scanner of claim 8 wherein said waveform generator comprises means for forming a sinusoidal waveform, so that said reference waveform has a sinusoidal shape and said intensity-modulated laser beam has a sinusoidally-varying intensity.

11. The laser scanner of claim 1 wherein:

said first electrical circuit includes a circuit for converting the amplitude-modulated range signal into an approximately square waveform so that said first converted waveform comprises said square waveform; and said second electrical circuit includes a circuit for converting the reference waveform into an approximately square waveform so that said second converted waveform comprises said square waveform.

12. The laser scanner of claim 8 wherein said optical scanning system includes a horizontal scanning mirror and a vertical scanning mirror operated cooperatively with the horizontal scanning mirror to scan a predetermined area.

13. An electrical processing circuit for a laser scanner that has a waveform generator for supplying a reference waveform at a reference frequency that modulates a laser diode to emit an intensity-modulated laser beam, said electrical processing circuit including a scanning system that scans a scene with the intensity-modulated laser beam and supplies reflected intensity-modulated light to a photodetector that converts the reflected intensity-modulated light into an electrical range signal, comprising:

a first mixer coupled to receive the range signal at the reference frequency and down-convert it to a lower, IF frequency;

an IF amplifier coupled to receive the IF frequency output of the first mixer;

a voltage clamping circuit coupled to receive the output from the IF amplifier and limit the voltage to a predetermined value;

a DC amplifier coupled to receive the output signal from the voltage clamping circuit;

a comparator coupled to receive the output signal from the DC amplifier and supply an approximately square first waveform signal whose zero crossings substantially correspond with the zero crossings of the input signal and whose amplitude is substantially independent of the amplitude of the input signal;

a second mixer coupled to receive the reference waveform at the reference frequency and down-convert it to the lower, IF frequency;

a phase detector coupled to compare the first square waveform signal with the down-converted reference waveform and provide an output indicative of the phase difference therebetween;

a second IF amplifier coupled to receive the IF frequency output of the second mixer;

a second voltage clamping circuit coupled to receive the output from the second IF amplifier and limit the voltage to a predetermined value;

a second DC amplifier coupled to receive the output signal from the second voltage clamping circuit; and a second comparator coupled to receive the output signal from the second DC amplifier and supply an approximately square second waveform signal whose zero crossings substantially correspond with the zero crossings of the reference signal.

14. The electrical processing circuit of claim 13 further comprising a low signal circuit for detecting an electrical range signal having a value less than a predetermined value, and responsive thereto, for replacing said range signal with an alternate range signal having a predetermined minimum value.

15. The electrical processing circuit of claim 14 wherein said low signal circuit is coupled to the output of said DC amplifier, said low signal circuit including a circuit for sensing the signal from said DC amplifier and a circuit for supplying an alternate signal if said signal from the DC amplifier is below a predetermined value.

16. A method of scanning a scene with a laser scanner, comprising the steps of:

providing a calibration target having a plurality of steps with predefined distances between them;

positioning the calibration target within the scene;

scanning the scene including the calibration target to supply calibration data and object data from the objects in the scene; and processing the object data using the calibration data as a known distance reference.

* * * * *